United States Patent [19]
Moller et al.

[11] 4,370,921
[45] Feb. 1, 1983

[54] DOUGHNUT FRYER GUIDE

[75] Inventors: George O. Moller, Dumont; Richard L. Twiford, South River, both of N.J.

[73] Assignee: International Telephone and Telegraph Corporation, New York, N.Y.

[21] Appl. No.: 256,324

[22] Filed: Apr. 22, 1981

[51] Int. Cl.³ ............................................. A47J 37/12
[52] U.S. Cl. ...................................... 99/405; 198/836
[58] Field of Search ................. 99/404, 405, 406, 407, 99/409, 443 C; 198/445, 446, 404, 836

[56] References Cited
U.S. PATENT DOCUMENTS

| | | | |
|---|---|---|---|
| 2,201,364 | 5/1940 | Carpenter | 99/405 |
| 2,229,605 | 1/1941 | Snyder et al. | 198/836 |
| 2,422,726 | 6/1947 | Goldacker | 198/836 |
| 3,329,081 | 7/1967 | Roth | 99/405 |
| 3,391,634 | 7/1968 | Williams et al. | 99/405 |

Primary Examiner—Billy J. Wilhite
Attorney, Agent, or Firm—John T. O'Halloran; David M. Quinlan

[57] ABSTRACT

The present invention involves a doughnut fryer guide to guide advancing dough forms through the hot oil bath in a doughnut frying machine. The doughnut fryer guide comprises a rack that supports a plurality of guide bars that limit movement of the advancing dough forms transverse to the direction of advance when the guide bars are in an operative position. Retracting means are provided for raising and lowering the rack to move the guide bars between a retracted and an operative position. In the retracted position the guide bars do not interfere with the dough forms advancing through the oil bath.

12 Claims, 6 Drawing Figures

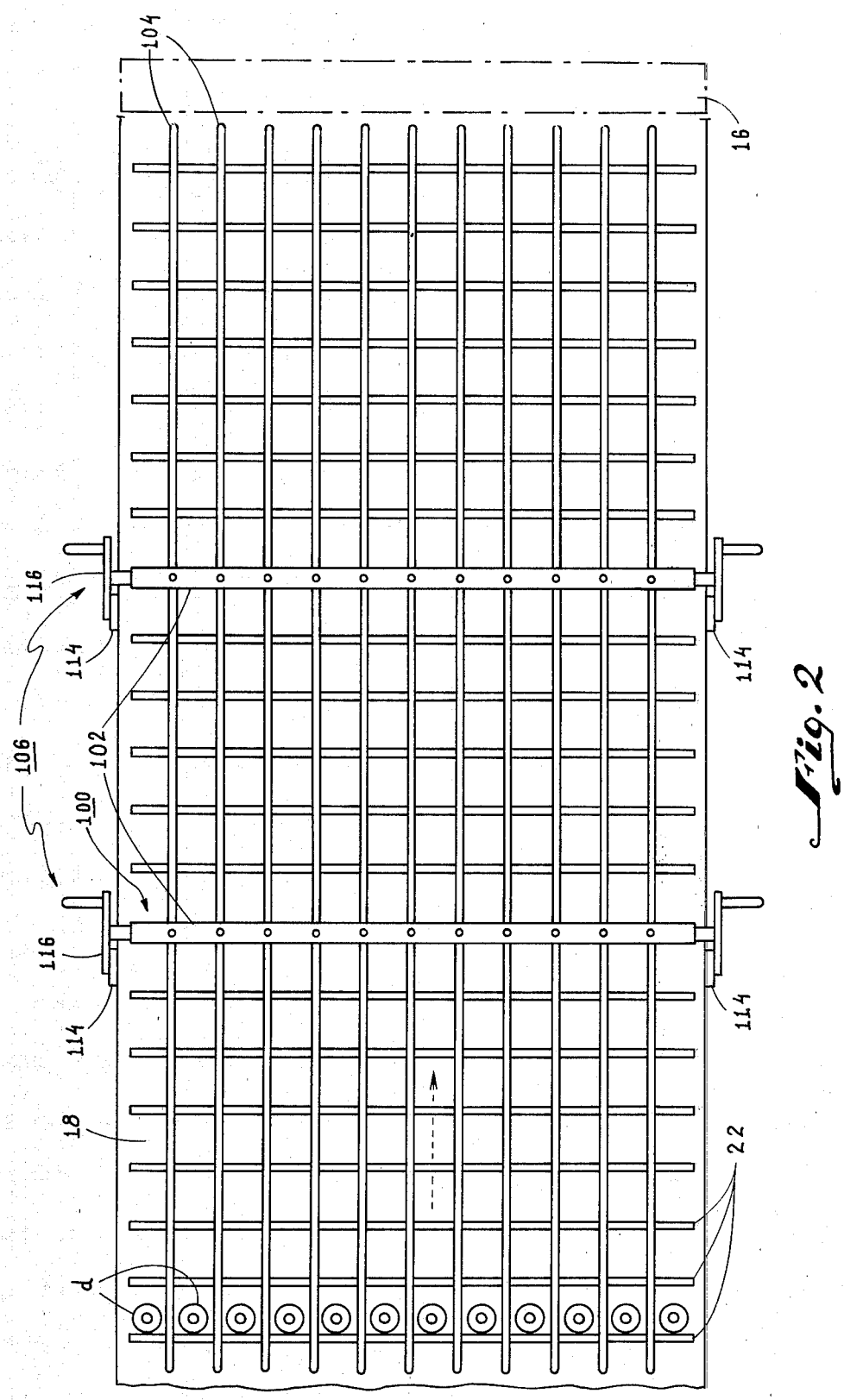

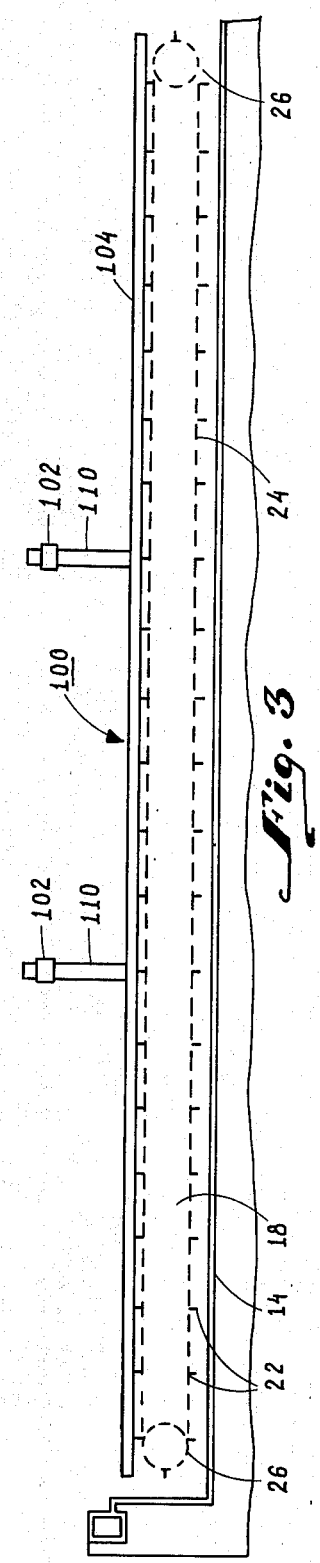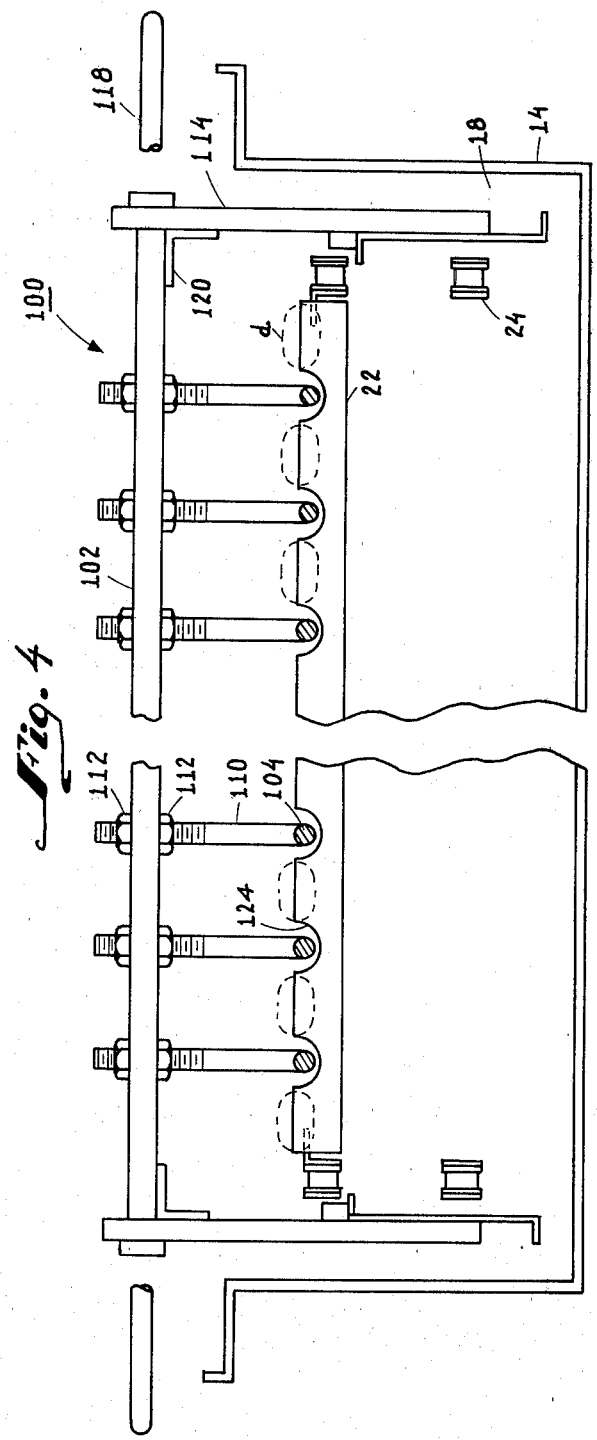

DOUGHNUT FRYER GUIDE

BACKGROUND OF THE INVENTION

1. Field of the Invention

The present invention relates to a doughnut fryer guide and more particularly to a doughnut fryer guide that enables more than one size doughnut to be fried on a doughnut frying machine.

2. Description of the Prior Art

Those skilled in the art are familiar with machines that automatically fry doughnuts in hot oil. U.S. Pat. No. 3,329,081 to Ernest J. Roth exemplifies the type of doughnut frying machine that the present invention renders significantly more useful.

Doughnut frying machines with which the present invention is most useful comprise a frying kettle that contains a hot oil bath. A turning device separates the hot oil bath into two portions, each of which contains propelling means that advance the dough forms through the bath. Each propelling means typically comprises a plurality of spaced pusher bars that transversely span the bath and attach at their ends to chains. The chains pass over motor-driven sprockets. The pusher bars of the propelling means in the first portion of the bath advance the dough forms (deposited at the first end of the bath by a depositing device) toward the turner. The hot oil fries the dough forms on one side as they travel through the first portion of the hot oil bath. The turning device flips them over into the second portion of the bath, where the other propelling means advances them toward a discharge means as they fry on the other side.

Automatic frying machines like that just described enable large amounts of doughnuts to be fried in a relatively short period of time with little intervention by an operator. However, they do have a limitation: Dough forms too small relative to the spacing between the pusher bars drift transversely to their direction of movement through the hot oil bath because of the violent agitation during frying. Then, when the dough forms reach the turner, they are no longer in well defined rows, causing problems in the turning operation. For example, some of the dough forms might only partially travel onto the turner and thus be turned over back into the first portion of the oil bath. Another dough form, in the next row presented to the turner by the next pusher bar, may then push the first dough form onto the turner, which this time is turned over into the second portion of the oil bath. Thus, the first dough form is fried for the second time on the same side but not at all on the other side. Or, as another example, the first dough form might be turned over onto the top of a dough form in the next approaching row. Those two dough forms might then turn over together into the second portion of the oil bath, preventing proper frying of either dough form where they are in contact. In any event, misfeeds at the turner require that one or more inspectors work at the discharge end of the frying machine to remove improperly fried doughnuts.

One approach to eliminating the additional labor and increased waste when frying too-small doughnuts involves using air jets to direct the dough forms into the turning device. U.S. Pat. No. 3,061,072 to Edward Schwertl shows the use of air jets to align dough forms as they near the turning device in a doughnut frying machine. Another approach involves manually straightening the dough forms as they reach the turning device. Another approach uses guides that extend the length of the first portion of the bath to maintain the dough forms in well defined rows as they advance and thus prevent them from drifting transversely. The use of guides in continuous cooking machinery is shown in U.S. Pat. Nos. 2,201,364 to Charles E. Carpenter and 3,391,634 to Robert W. Williams.

Of those solutions, the use of guides has been found to be the most effective. Air jets, for example, become easily clogged in the environment of boiling and splattering oil of a doughnut frying machine. Manually turning or placing the dough forms as they reach the turner involves additional labor and thus defeats the purpose of using automatic cooking machinery.

However, known guide bar apparatus suffers from a significant shortcoming: a machine equipped with guide bars can produce only one size doughnut. Therefore, that approach does not really represent a solution to the problem because it merely changes the machine so that it can only make smaller doughnuts. Another machine is still required to make larger doughnuts; in other words, the known prior art does not disclose a machine or means for making different sizes of doughnuts.

SUMMARY OF THE INVENTION

The present invention is a doughnut fryer guide for use in a doughnut frying machine that has propelling means for advancing dough forms through a hot oil bath. The doughnut fryer guide of the present invention comprises a plurality of guide bars for limiting the movement of the advancing dough forms transverse to the direction of advance when the guide bars are in an operative position. The doughnut fryer guide also comprises a retracting means for moving the guide bars between their operative position and a retracted position in which they do not interfere with the movement of the dough forms.

BRIEF DESCRIPTION OF THE DRAWINGS

FIG. 2 is a top view of the first portion of the oil bath of a doughnut frying machine like that shown in FIG. 1 incorporating the doughnut fryer guide of the present invention.

FIG. 3 is a side view of the first portion of the oil bath of the doughnut frying machine shown in FIG. 2.

FIG. 4 is a detail view of the doughnut fryer guide of the present invention and its relationship to the propelling means of the doughnut frying machine.

DETAILED DESCRIPTION OF THE EMBODIMENTS

Figure 1A:
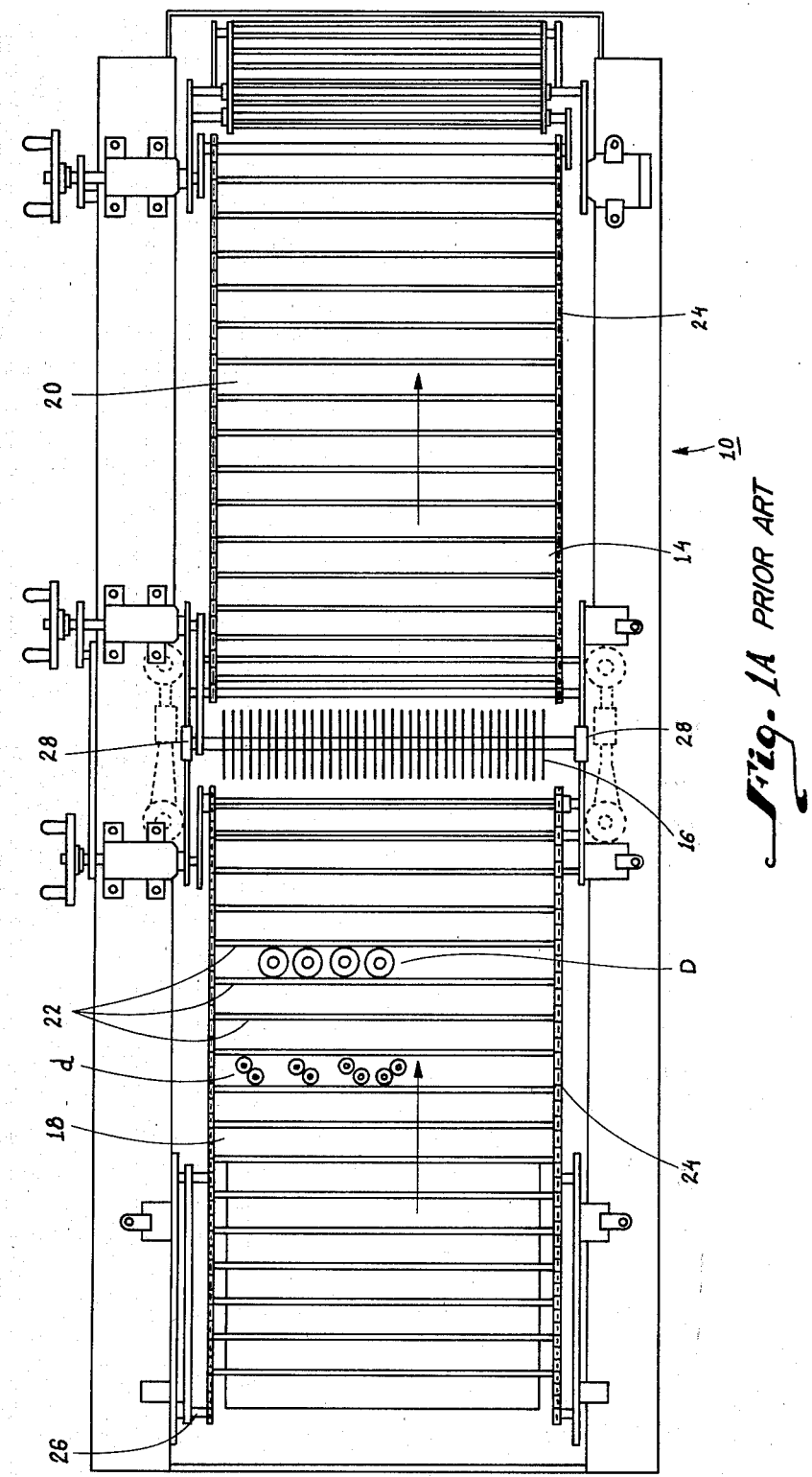
FIGS. 1A and 1B show a doughnut frying machine of the type with which the present invention is particularly useful.
Figure 1B:
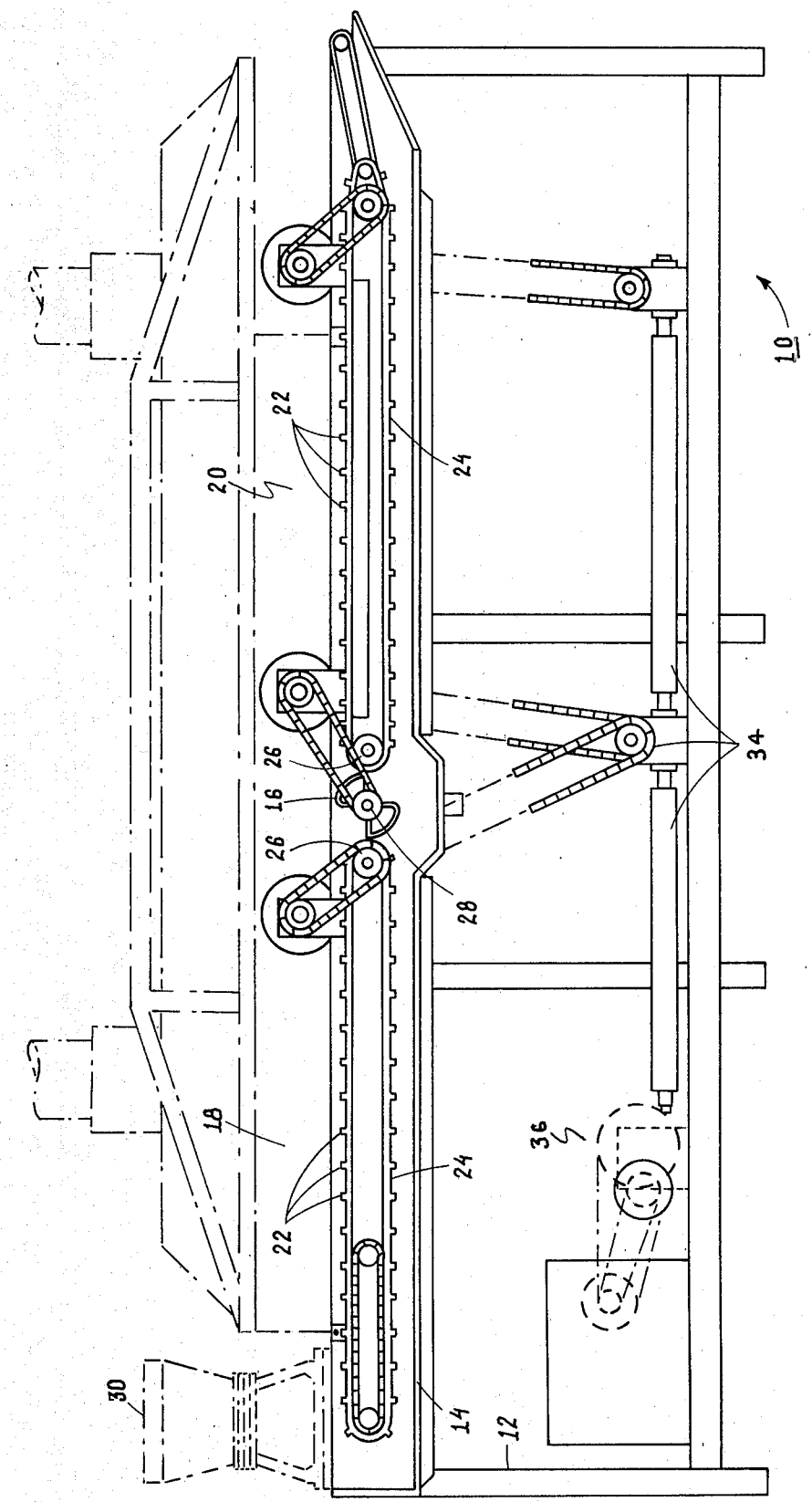

FIGS. 1A and 1B show a frying machine 10 of the type for which the present invention is particularly adapted. It is similar to the frying machine shown in U.S. Pat. No. 3,329,081 to Roth mentioned above. Those skilled in the art know how this and similar machines operate. Thus, only the parts of it necessary for understanding the present invention are described here.

The frying machine 10 comprises a frame 12. The frame 12 supports a frying kettle 14 that, in operation, is filled to a predetermined level with oil and heated to a temperature sufficient to fry raw dough. A turning device 16 separates the kettle 14, and the oil bath, into a first part 18 and a second part 20. Each of the parts 18 and 20 contains a propelling means. The propelling means comprises a plurality of pusher bars 22 that transversely span the kettle 14. At their ends, the pusher bars 22 mount to endless chains 24. The frame 12 rotatably mounts sprockets 26, and chains 24 extend around the sprockets 26. The frame 12 also rotatably mounts the turning device 16, which has sprockets 28 at its ends. The frame 12 also holds a depositing device 30 above one end of the kettle 14. Drive chains and shafts 34 connect a motor 36 to the various sprockets 26 and 28 and to the depositing device 30 to provide synchronous motion of the depositing device 30, the pusher bars 22 in the first portion of the bath, the turning device 16 and the pusher bars 22 in the second portion of the bath.

In operation, the kettle 14 contains hot liquid oil at a level sufficient to submerge about one-half of each pusher bar 22. The machine 10 includes means for heating the oil (not shown) to a suitable temperature that will fry the dough forms during their travel in both portions of the oil bath. To make doughnuts the depositing device 30 places a row of toroidal dough forms of a predetermined diameter between two of the pusher bars 22 in the first portion 18 of the oil bath. The row of dough forms is advanced through the first portion 18 of the oil bath to the rotating turning device 16. The row of dough forms passes on to one of the flats on the turning device 16, which picks up the entire row of dough forms and flips them over into the second portion 20 of the oil bath. A pusher bar 22 there advances the row of dough forms to the discharge end of the machine. The depositing device 30 works intermittently to place a row of dough forms between each pair of pusher bars 22 and the various chains, sprockets and drive shafts synchronize the movement of all of the parts and thus render the machine completely automatic in operation.

FIG. 1A illustrates the difficulty in using the doughnut frying machine 10 to fry dough forms having an outside diameter too small relative to the spacing between the pusher bars 22. The large dough forms D are held in rows by adjacent pusher bars 22. However, the smaller doughnuts d can drift transversely as shown in FIG. 1A and the turning device 16 will not uniformly turn them. Providing guide bars for the advancing smaller dough forms d or placing the pusher bars 22 closer together solves the problem of transverse drift. However, both of those "solutions" prevent the machine from being used to make larger doughnuts because the large dough forms will not fit in the spaces between the pusher bars 22 or adjacent guide bars.

The present invention, on the other hand, permits the use of a machine like that depicted in FIGS. 1A and 1B to dry different sizes of doughnuts. As shown in FIGS. 2 through 4, the present invention comprises a fryer guide 100 to guide the dough forms during their advance through the first part 18 of the oil bath. The fryer guide of the present invention includes a rack comprising two support beams 102 that support a plurality of guide bars 104 for limiting the movement of the advancing dough forms d transverse to the direction of advance when the rack is in an operative position. The doughnut fryer guide of the present invention also includes retracting means 106 that raise and lower the rack to move the guide bars 104 between a retracted position and an operative position. In the retracted position the guide bars 104 do not interfere with the large dough forms D as they advance through the first part 18 of the oil bath.

FIGS. 3 and 4 show the support beams 102 of the doughnut fryer guide 100 of the present invention in the operative position and the details of the connection between the support beams 102 and the guide bars 104. The support beams 102 mount the guide bars 104 by suspension arms 110. Each suspension arm 110 is welded to an associated guide bar 104 and extends through a hole in the support beam 102. The ends of the suspension arms 110 are threaded and nuts 112 hold them to the support beam 102. The use of threaded ends and nuts 112 permit adjustment of the relative distance between the guide bars 104 and the support beams 102 and enable proper alignment of the guide bars 104.

Figure 5:
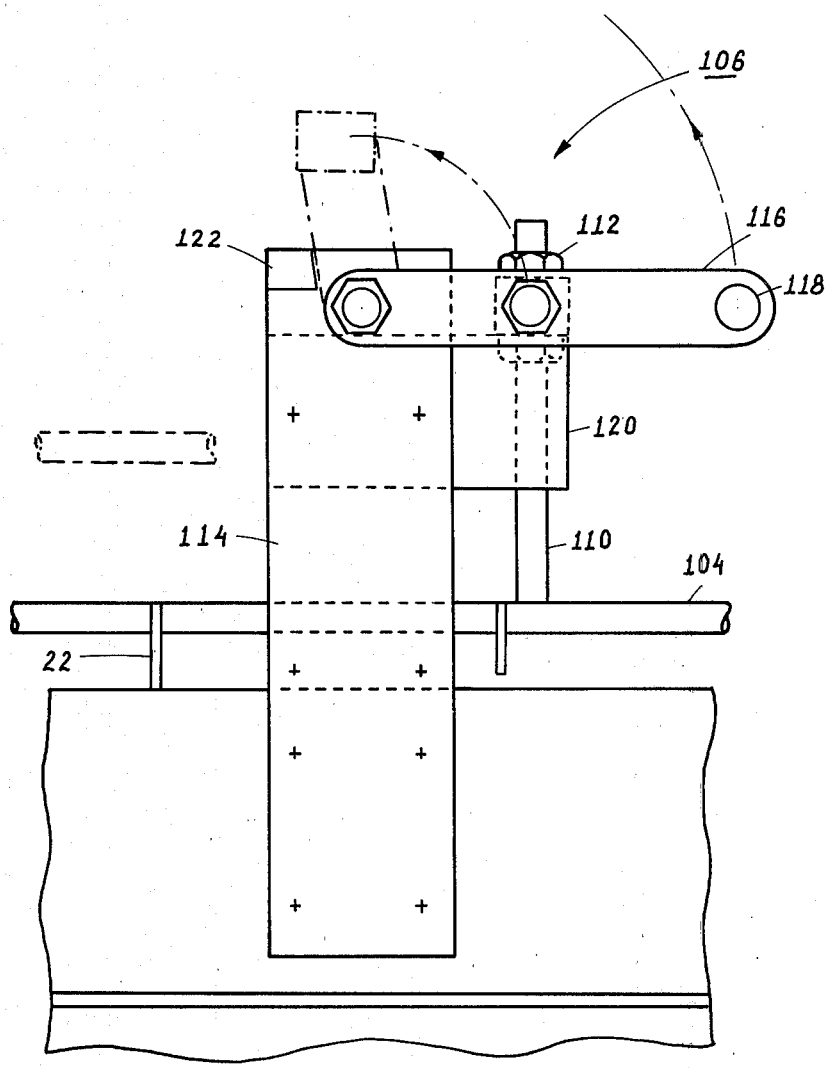
FIG. 5 is a detail view of the retracting means of the doughnut fryer guide of the present invention.

The retracting means 106 of the present invention comprises four supporting stanchions 114 bolted to the frame of the propelling means. This is best illustrated in FIG. 4 (where the bolts have been omitted for clarity), which shows the faces of the bottom portions of two of the supporting stanchions 114 held against the frame of the propelling means. FIG. 5 shows schematically the location of the bolts. As FIG. 2 shows, each end of the beam 102 has associated with it a supporting stanchion 114.

FIGS. 2 through 5, particularly FIG. 5, together show the structure of the retracting means 106. Each stanchion 114 rotatably mounts one end of a crank arm 116. The other end of each of the crank arms 116 mounts a handle 118. The support beams 102 are rotatably mounted to the crank arms 116 between the ends of the crank arms. Brackets 120 welded to the support stanchions 114 form ledges that contact the support beams 102 to hold the guide bars in their operative position. Other stops 122 welded to the support stanchions 114 limit rotation of the crank arm 116 counterclockwise (as shown in FIG. 5) to a slightly overcenter position relative to the mounting point of the crank arm to the supporting stanchion. When the crank arms 116 contact the stops 122, the guide bars are in their retracted position.

In operation, the doughnut frying machine is prepared as described above. Liquid oil is placed in the frying kettle 14 to a level to submerge about one-half of each pusher bar 22. The nuts 112 are used to adjust the location of the guide bars 104 while in the operative position (with the support beams resting against the brackets 120) so that slightly over one-half of the cross-section of the guide bars 104 is submerged in the oil. To accomplish that it may be necessary to provide slots 124 (see FIG. 4) in the pusher bars 22 to accommodate the guide bars. Alternatively, the guide bars 104 can be adjusted to provide a slight clearance for the pusher bars 22. That yields less positive guidance for the advancing dough forms, but prevents the necessity of providing the slots 124 in the pusher bars 22. However, less submersion of the guide bars causes them to warp slightly because of uneven thermal expansion under the influence of the hot oil.

In any event, with the guide bars 104 in the operative position, a depositing device 30 for depositing smaller dough forms is placed at the end of the first portion 18 of the oil bath. The machine is then operated in its normal fashion. If larger doughnuts are to be made, two operators, one on each side of the frying machine, grasp the handles 118 and lift them, rotating the crank arms 116 until they come to rest at the second stop 122. The support bars 102 are about 27" apart, which is a convenient distance for the operators to reach for each handle 118. A different depositing device, one that deposits larger dough forms, can then be placed on the machine and the machine again is operated in a normal fashion.

Thus, the present invention enables a conventional doughnut frying machine to make different size doughnuts automatically and without waste or the necessity for providing additional manual labor.

Although representative embodiments and modifications of the present invention have been described, those skilled in the art will recognize other modifications that can be made to the disclosed embodiments. The scope of the present invention is therefore defined by the appended claims and is not limited by the foregoing description.

We claim:

1. A doughnut fryer guide for use in a doughnut frying machine having propelling means for advancing dough forms through a hot oil bath, said doughnut fryer guide comprising:
   a plurality of guide bars secured together as a unit for limiting movement of a plurality of adjacent rows of advancing dough forms transverse to the direction of advance and maintaining said advancing dough forms in said plurality of rows when said guide bars are in an operative position; and
   retracting means for moving said guide bars as a unit between said operative position and a retracted position in which said guide bars do not interfere with the movement of the dough forms.

2. The doughnut fryer guide recited in claim 1 for use with a doughnut frying machine having a frame, wherein said guide bars are secured together by a rack and said retracting means comprises attachment means for securing said retracting means to the frame for raising and lowering said rack relative to the frame.

3. A doughnut fryer guide for use with a doughnut frying machine having a frame and propelling means for advancing dough forms through a hot oil bath, the doughnut fryer guide comprising a rack, a plurality of guide bars supported by said rack for limiting movement of advancing dough forms transverse to the direction of advance when said guide bars are in an operative position, and retracting means for moving said guide bars between said operative position and a retracted position in which said guide bars do not interfere with the movement of the dough forms, wherein:
   said rack comprises at least one support beam for extending across said oil bath transverse to the direction of advance of the dough forms;
   said guide bars are secured to said support beam; and
   said retracting means comprises attachment means for securing said retracting means to the frame for raising and lowering said rack relative to the frame, at least one pair of supporting stanchion means for attachment to the machine frame by said attachment means and crank means rotatably mounted to said stanchions, wherein said support beams are rotatably mounted proximate to their ends to said crank means for raising and lowering said rack to move said guide bars between said retracted and operative positions when said crank means is rotated.

4. The doughnut fryer guide recited in claim 3, wherein each said crank means includes a handle for rotating said crank means.

5. The doughnut fryer guide recited in claim 4, wherein said rack comprises two said support beams spaced so that the distance between them is approximately 27".

6. The doughnut fryer guide recited in claim 3, 4, or 5 wherein each said supporting stanchion means includes a first limit stop for cooperating with said support beams to hold said guide bars in said operative position, a second limit stop for cooperating with said crank means to hold said guide bars in said retracted position, and said crank means moves overcenter relative to its stanchion mounting point for contacting said second limit stop.

7. The doughnut fryer guide recited in claim 3, 4, or 5 wherein said guide bars are suspended from said support beams by rigid suspension arms.

8. The doughnut fryer guide recited in claim 7, wherein said suspension arms are rigidly secured to said guide bars and adjustably mounted to said support beams for adjustment of the distance between said guide bars and said support beams.

9. A doughnut frying machine comprising:
   a frame supporting a frying kettle for containing a hot oil bath and propelling means for advancing dough forms through said hot oil bath;
   a doughnut fryer guide comprising a rack supporting a plurality of guide bars for limiting the movement of advancing dough forms transverse to the direction of advance when said guide bars are in an operative position and retracting means securing said rack to said frame for movement of said guide bars between said operative position and a retracted position in which said guide bars do not interfere with the movement of the dough forms.

10. The doughnut frying machine recited in claim 9, wherein:
    said rack comprises two support beams extending across said frying kettle transverse to the direction of advance of the dough forms;
    said guide bars are rigidly suspended from said support beam; and
    said retracting means comprises four supporting stanchions secured to said frame proximate to the ends of said support bars and crank means rotatably mounted to each stanchion and proximate to the ends of said support beams for raising and lowering said rack to more said guide bars between said retracted and said operative positions when said crank means is rotated.

11. The doughnut frying machine recited in claim 9 or 10 wherein:
    said propelling means include a plurality of pusher bars of predetermined spacing therebetween having slots formed in their upper edges, wherein said slots of successive pusher bars are aligned along the direction of movement of said pusher bars; and
    said guide bars are substantially round in cross-section and are spaced from one another a distance equal to that between adjacent slots in said pusher bars for entering said slots when in said operative position.

12. The doughnut frying machine recited in claim 11, wherein said retracting means holds said guide bars at a predetermined location in said operative position for submerging approximately one-half of the area of the cross-section of said guide bars in the hot oil.

* * * * *